(12) United States Patent
Entringer et al.

(10) Patent No.: US 6,669,239 B1
(45) Date of Patent: Dec. 30, 2003

(54) SEALING DEVICE FOR A CONDUIT PASSING THROUGH A WALL

(75) Inventors: David C. Entringer, Wautoma, WI (US); Timothy P. Wickman, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 10/141,243

(22) Filed: May 8, 2002

(51) Int. Cl.[7] .................................................. F16L 5/00
(52) U.S. Cl. ...................... 285/215; 285/209; 285/376; 285/401
(58) Field of Search ................................ 285/215, 204, 285/401, 376, 360, 209, 216, 346, 210, 140.1, 139.2

(56) References Cited

U.S. PATENT DOCUMENTS

| | | | | |
|---|---|---|---|---|
| 729,545 | A | * | 6/1903 | Chaplin ....................... 285/376 |
| 1,309,830 | A | * | 7/1919 | Wanamaker ................ 285/376 |
| 3,468,565 | A | * | 9/1969 | Roder ......................... 285/360 |
| 3,716,257 | A | * | 2/1973 | Hackman et al. ........... 285/210 |
| 3,888,454 | A | | 6/1975 | Treadaway ................... 249/90 |
| 4,174,126 | A | | 11/1979 | Hauff ......................... 285/158 |
| 4,428,560 | A | * | 1/1984 | Erdelsky ..................... 285/376 |
| 4,656,689 | A | | 4/1987 | Dennis ............................. 16/2 |
| 5,029,879 | A | | 7/1991 | Strang, Sr. et al. ......... 277/178 |
| 5,353,445 | A | | 10/1994 | Denzin ........................... 4/378 |
| 5,516,370 | A | * | 5/1996 | Karnauchow et al. ... 134/22.12 |
| 5,697,194 | A | | 12/1997 | Gignac et al. ................ 52/220 |
| 5,866,853 | A | | 2/1999 | Sheehan ....................... 174/65 |
| 6,237,645 | B1 | * | 5/2001 | Pountney ....................... 141/7 |
| 6,322,284 | B1 | * | 11/2001 | Bonardo et al. ............ 285/376 |
| 6,338,651 | B1 | | 1/2002 | Svette, Jr. et al. .......... 439/559 |

OTHER PUBLICATIONS

Legris Product Specification and Company Information.

* cited by examiner

Primary Examiner—David Bochna
(74) Attorney, Agent, or Firm—William D. Lanyi (57) ABSTRACT

A device is provided for allowing a conduit to extend through a wall while providing a seal around the conduit. The conduit extends through an opening formed in the wall and the conduit has a first end, a second end, and a central axis extending within the cavity of the conduit and along its length. First and second protrusions of the first end of the conduit are shaped to be received through first and second slots of the opening formed through the wall. A resilient seal member is attached to the first end of the conduit and is compressible by moving the conduit out of a first position relative to the opening in which the first and second protrusions are aligned with the first and second slots. By moving the conduit away from its first position, the resilient seal member is compressed to provide a liquid seal which prevents liquid from leaking through the opening formed through the wall.

24 Claims, 7 Drawing Sheets

SEALING DEVICE FOR A CONDUIT PASSING THROUGH A WALL

BACKGROUND OF THE INVENTION

1. Field of the Invention

The present invention is generally related to a sealing device for a conduit extending through a wall, and, more particularly, to a sealing device that allows a tube to be quickly and easily attached to a wall, for conducting a fluid through the wall, in a secure manner without the need for the use of tools.

2. Description of the Prior Art

Many different types of applications require that a conduit extend through a wall in such a way that fluids are prevented from passing through the opening in the wall other than through the internal passage of the conduit.

U.S. Pat. No. 5,697,194, which issued to Gignac et al on Dec. 16, 1997, describes a modular seal assembly for a wall opening. A modular seal assembly for sealing a circular opening through a wall, usually with one or more conduits extending through the seal is described. The assembly includes an outer pressure annulus and a thick inner pressure disc, both of natural or synthetic rubber, EPDM, urethane, or other elastomer. In the outer annulus the elastomer is an annular series of interconnected blocks having a length and having a central opening of a predefined radius; a series of pressure bolts compress the blocks axially, expanding the annulus both outwardly and inwardly. The inner disc, which has an outer radius of a predefined magnitude and is interlocked with the elastomer blocks of the outer annulus, has a multiplicity of circular layers, much like an onion; the layers are concentric about an opening through which a conduit usually extends. Tightening the pressure bolts causes the outer annulus to compress the disc, forcing the disc against the conduit to complete a seal; the elastomer blocks of the outer annulus seal against the wall opening.

U.S. Pat. No. 5,029,879, which issued to Strang, Sr. et al on Jul. 9, 1991, describes a seal for a pipe to wall junction. An improved seal of the junction of a pipe or tube to an opening formed in a flat wall or in the wall of a cylindrical or rounded container, including axially tapered exterior and interior peripheral surfaces. The tapers of such surfaces are different one from the other and are of such a degree that, when the seal is inserted into the opening and the receiving member and the pipe is inserted therethrough, the material from which the seal is fabricated is forced to bulge around the periphery of the opening, thereby securing the pipe in the opening and perfecting the seal therebetween.

U.S. Pat. No. 4,656,689, which issued to Dennis on Apr. 14, 1987, describes a grommet. It describes an easy to install grommet device for protecting conduit passing through a wall opening and for providing an air seal between the conduit and the edge of the wall around the wall opening. The grommet device has a relatively stiff fastener portion with projections extending therefrom and locking devices at the ends of the projections for engaging the edges of the wall around the wall opening. An elastomeric seal portion receives the projections and has an aperture of smaller dimensions than the outside dimensions of the conduit.

U.S. Pat. No. 4,174,126, which issued to Hauff on Nov. 13. 1979, describes a wall feedthrough fitting. The fitting comprises a feedthrough tube that is embedded in a wall and has a pair of opposite ends each exposed to the respective face of the wall. An annular seal surrounds the tube adjacent one of the ends and radially inwardly bears on the tube and radially outwardly bears on a holding ring embedded in the wall and spaced around the tube. This holding ring extends axially toward one end of the tube beyond the seal and has between the seal and this one end an internal screw thread. A pressure ring is threaded into this holding ring and may bear directly via an axial face or indirectly via an intermediate ring on the seal. The tube may be provided at its one end with an external thread that engages a complementary thread inside the pressure ring.

U.S. Pat. No. 3,888,454, which issued to Treadaway on Jun. 10, 1975, describes a means for forming a seal about a conduit. A method and means for forming a resilient plastic seal about a conduit extending through the wall of a housing or vessel and to anchor the conduit to the wall is described. It comprises a mold having a passage with an open cavity on one face thereof and a passage therethrough through which the conduit may be extended. The open cavity of the mold is retained in position against the surface of the wall through which the conduit extends by means of an annular groove on the inner side thereof to which a suction is applied to hold same to the wall through vacuum. An opening is provided in the mold through which plastic material such as polyurethane may be injected in liquid form and allowed to set and harden about the conduit to provide a resilient bonded seal between the wall and the conduit to resiliently secure the conduit to the wall.

U.S. Pat. No. 5,353,445, which issued to Denzin on Oct. 11, 1994, describes a conduit attachment system. An assembly for connecting a plumbing conduit to a wall is disclosed. In one aspect there is an outlet formed in a wall of the tank and a resilient seal bearing against an inner surface of the wall around the outlet. The seal has a bore aligned with the outlet. A connector tube sandwiches the seal against the wall and also extends through the bore and outlet. The connector is held in place by a radially outwardly extending flange and a locking ring inside the connector.

U.S. Pat. No. 6,338,651, which issued to Svette, Jr. et al on Jan. 15, 2002, describes an electrical connector assembly with a seal. The assembly supports a number of terminals as they extend through a wall such as one might find in a headlamp housing to mate with mating terminals outside the housing. The electrical connector assembly includes an elongated conduit or housing for supporting the terminals as they extend through the wall, where the conduit has a flange extending radially outwardly from one end of the conduit. The connector assembly also includes a seal having a jacket portion extending around the conduit adjacent the flange, and a skirt portion extending radially outward from the conduit and over the flange to effect a seal between the electrical connector assembly and the wall.

U.S. Pat. No. 5,866,853, which issued to Sheehan on Feb. 2, 1999, describes a liquid-tight, strain-relief connector for connecting conduit and the like. It provides a strain-relief, liquid-tight connector for connecting conduit or the like to a bulkhead such as an electrical box, with the connector having a body having front and rear portions, and a substantially hollow inner throughbore formed along a longitudinal axis thereof. The front portion of the connector body is adapted for attachment to a bulkhead. A flexible seal member is mounted at least partially within the hollow inner throughbore for receiving a conduit inserted therethrough, this seal member facilitating a substantially liquid-tight seal about an inserted conduit during use. An at least partially hollow grip for selectively gripping the conduit is included and a clamp nut is telescoped over the rear portion of the body for selective longitudinal adjustment therealong. The longitudinal adjustment of this clamp nut provides inward radial compression of the flexible grip about the conduit. In a preferred embodiment, the grip member comprises a plurality of gripping fingers cantilevered from a ring like base portion and the seal member is at least partially disposed within the grip member. A cam surface is provided in the interior of the body and a compression member on the clamp nut urges the gripping fingers against this cam surface thereby causing the fingers to be compressed radially inward. This results in the conduit being gripped and also enhances the sealing of the seal member about the conduit.

The patents described above are hereby expressly incorporated by reference in the description of the present invention.

Although many different types of sealing devices are known to those skilled in the art for use when a conduit is extended through an opening formed in a wall, known types of sealing devices require several component parts and typically require the use of tooling to assemble the component parts together in order to install the conduit through the hole formed in a wall with a sufficiently liquid tight relationship between the conduit and the wall. It would therefore be significantly beneficial if a sealing device could be provided which does not require tools and which does not comprise a plurality of individual component parts, but which effectively prevents the passage of liquid through the opening in a wall other than through the internal passage of the conduit.

SUMMARY OF THE INVENTION

A device for providing a seal around a conduit extending through a wall, made in accordance with the preferred embodiment of the present invention, comprises an opening formed through the wall and a conduit having a first end, a second end, and a central axis extending within a cavity of the conduit and along its length. A first protrusion is attached to the conduit proximate the first end and extending in a direction generally radially outwardly from the central axis. The first protrusion is shaped to pass through the opening when the conduit is disposed in a first position relative to the opening, but to prevent the first protrusion from passing through the opening when the conduit is not disposed in the first position relative to the opening. In addition, the device comprises a resilient seal member attached to the first end of the conduit. The resilient seal member is shaped to be received within the opening and be disposed in sealing association between the conduit and the wall when the conduit is not disposed in the first position relative to the opening.

In a particularly preferred embodiment of the present invention, the wall is an adaptor plate of an outboard motor and the device comprises a second protrusion attached to the conduit proximate the first end and extending in a direction generally radially outward from the central axis. The second protrusion is shaped to pass through the opening when the conduit is disposed in the first position relative to the opening, but to prevent the second protrusion from passing through the opening when the conduit is not disposed in the first position relative to the opening. In a preferred embodiment, the first and second protrusions are diametrically opposed to each other. The present invention can further comprise a collar extending radially from the first end of the conduit, with the resilient member being disposed between the first protrusion and the collar. The resilient member is shaped to be compressed between the collar and the first and second protrusions when the conduit is not disposed in the first position relative to the opening. The resilient member can be provided with extensions that can be aligned with the first and second protrusions to facilitate the insertion of the resilient member into the opening formed in the wall.

The opening formed in the wall is provided with a first slot shaped to receive the first protrusion therein in order to allow the first protrusion to pass through the first slot when the conduit is disposed in the first position relative to the opening. The resilient member can comprise a split line which facilitates the insertion of the first end of the conduit into a central cavity of the resilient seal member. The second end of the conduit is attached in fluid communication with a fuel reservoir of an outboard motor. The fuel reservoir can be a fuel system module attached to a driveshaft housing of the outboard motor. The first end of the conduit is connectable in fluid communication with a fuel system of the outboard motor.

A particularly preferred embodiment of the present invention provides first and second protrusions which extend in directions generally radially outward from the central axis of the conduit and away from each other. The first and second protrusions are shaped to allow the first end to pass through the opening in the wall when the conduit is disposed in the first position relative to the opening. The first and second extensions are attached to the resilient seal member or formed as an integral part thereof, and aligned with the first and second protrusions, respectively to facilitate insertion into the opening. The opening has first and second slots shaped to receive the first and second protrusions, respectively, therein to allow the first and second protrusions to pass through the first and second slots, respectively, when the conduit is disposed in the first position relative to the opening.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment of the present invention, like components will be identified by like reference numerals.

Figure 1:
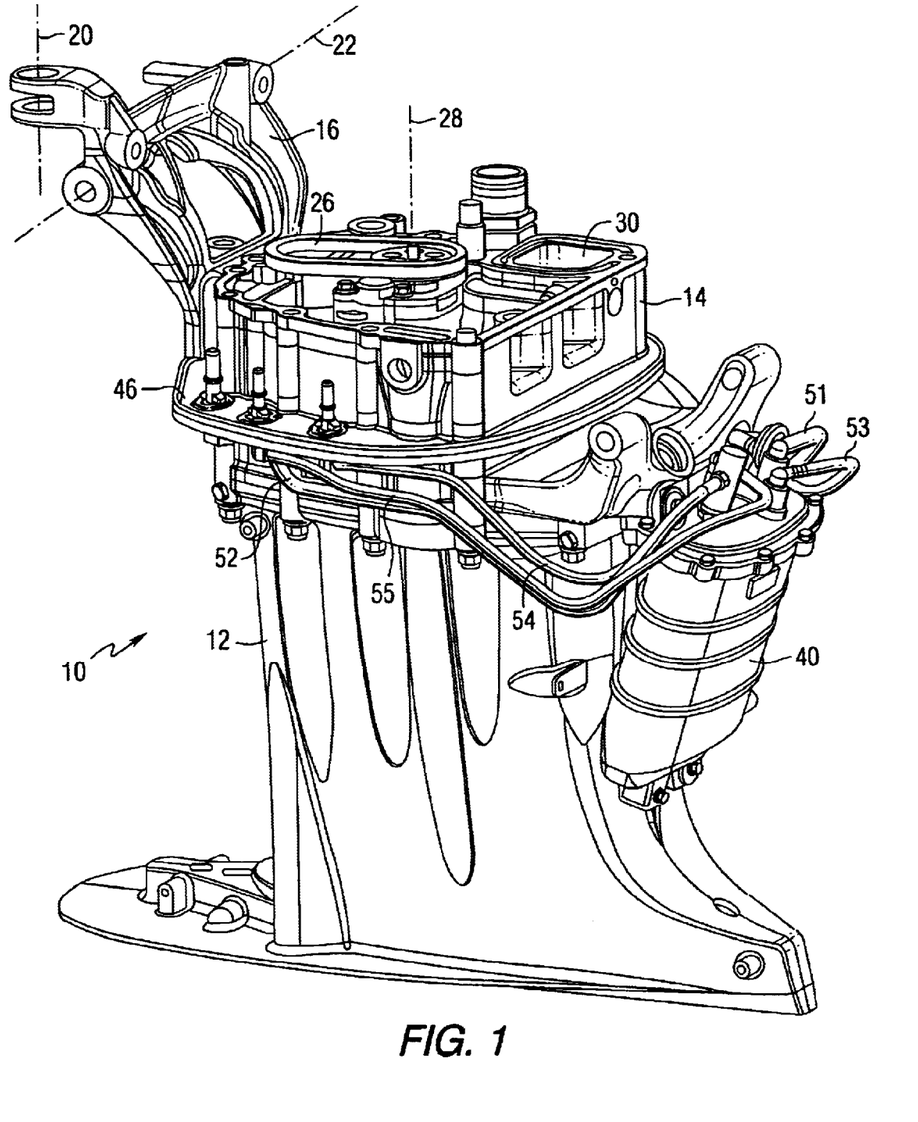
FIG. 1 is an isometric view of a driveshaft housing of an outboard motor with which the present invention is incorporated.

FIG. 1 illustrates the portions of an outboard motor 10 that are generally related to the present invention or located nearby. In FIG. 1, a driveshaft housing 12 is shown with an adaptor plate 14 attached thereto. The adaptor plate is shaped to receive an internal combustion engine on its upper portion. For purposes of clarity, the internal combustion engine is not illustrated in FIG. 1. The outboard motor 10 is provided with a bracket 16 that supports the outboard motor and allows it to be rotated about a steering axis 20 and trimmed about a trim axis 22. A belt 26 allows an oil pump assembly to be driven about its rotational axis 28 when the belt 26 is rotated by a connection to the crankshaft of the engine. An exhaust passage 30 is shaped to direct a flow of exhaust gases downwardly through the driveshaft housing 12.

In one particularly design of an outboard motor, a fuel system module 40 is attached for support to a rear portion of the driveshaft housing 12. In this particular outboard motor design, the fuel system module 40 is intended to be at least partially submerged below the surface of a body of water in which the outboard motor 10 is used when the associated marine vessel is stationary. A wall 46 is generally horizontal and separates the engine compartment under a cowl of the outboard motor 10 from the region below the wall 46 which includes the driveshaft housing 12 and the fuel system module 40. Although the components below the wall 46 are intended to be subjected to wetting by the water of the body of water in which the outboard motor 10 is operated, the components above the wall 46 are intended to remain relatively dry and protected under a cowl of the outboard motor.

The relationship illustrated in FIG. 1 requires that the wall 46 act as a liquid barrier to prevent water from passing upwardly from the region of the driveshaft housing 12 into the region surrounding the engine and under the cowl. However, since the fuel system module 40 is located below the wall 46 and the fuel system of the engine is located above the wall 46, some means must be provided to allow fuel and water to pass through the wall 46 while maintaining the intended liquid separation between the regions below and above the wall 46.

Several fluid conduits are illustrated in FIG. 1. For example, conduits 51 and 52 are fuel lines that conduct fuel between the fuel system module 40 and the fuel delivery system of the engine located under the cowl and above wall 46. Conduit 53 is a vent line, conduit 54 is a water line, and conduit 55 provides a manifold pressure reference. As can be seen in FIG. 1, these five conduits, 51–55, all extend from the fuel system module 40. Each of these conduits must pass through the wall 46 in order to be connected to their appropriate locations under the cowl.

Figures 2, 3:
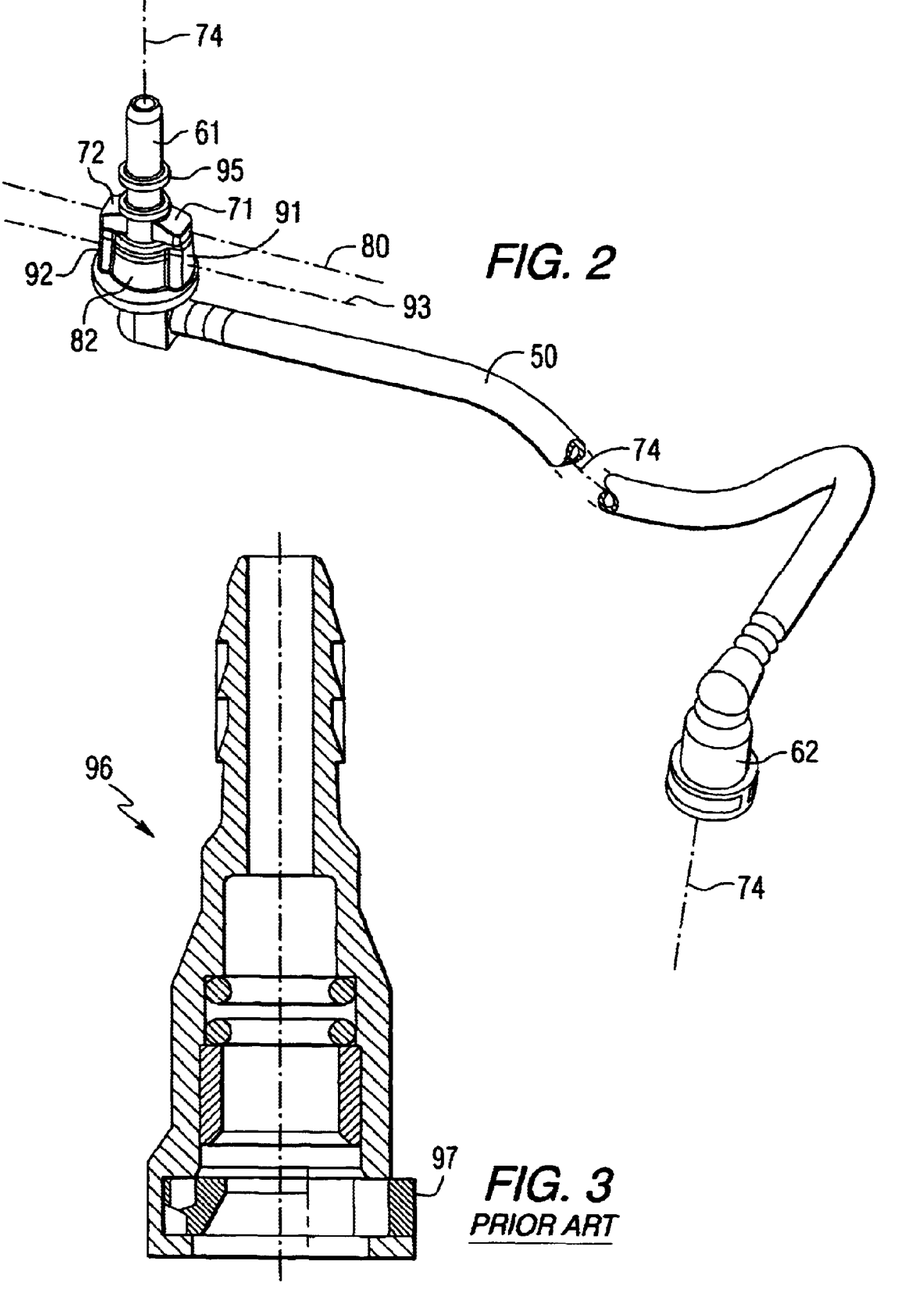
FIG. 2 is an isometric view of a conduit made in accordance with the present invention.
FIG. 3 shows a quick disconnect device known to those skilled in the art.

FIG. 2 illustrates an exemplary conduit 50 which is generally representative of the conduits, 51–55, described above in conjunction with FIG. 1. The conduit has a first end 61 and a second end 62. The second end 62 is a female connector that is available in commercial quantities from "legris" which is a division of Groupe Legris Industries. The second end 62 in FIG. 2 is formed with a right angle bend to facilitate this particular application. As will be described below, FIG. 3 is a similar connector, also available commercially from "legris" which is in-line configuration. The first end 61 of the conduit 50, illustrated in FIG. 2, is shaped as a male connector that is intended to be received, in sealed relation, with a connector similar to that which is disposed at the second end 62 in FIG. 2 and also illustrated in FIG. 3.

With continued reference to FIG. 2, the first end 61 of the conduit 50 is provided with first and second protrusions, 71 and 72, which are attached to the conduit and extend in a direction generally radially outward from the central axis 74 of the conduit 50. It should be understood that the central axis 74 is described herein for the purpose of providing a reference from which various components of the present invention extend. It is an imaginary line that extends along a central axis of the first and second ends, 61 and 62, and the entire conduit 50. As illustrated in the central portion of FIG. 2, the central axis 74 is not a straight line along its entire length. It is used to represent the center points of the assembly, within the central cavity of the conduit 50 and its first and second ends, 61 and 62, along its entire length. As can be seen, the first and second protrusions, 71 and 72, extend radially away from the first end 61 and generally along axis 80. The purpose of the first and second protrusions, 71 and 72, will be described below in greater detail. The present invention also comprises a resilient seal member 82 that is attached to the first end 61 of the conduit 50. The resilient seal member 82 is shaped to be received within an opening formed through the wall 46, which is described above in conjunction with FIG. 1. More specifically, the first and second protrusions, 71 and 72, are shaped to pass through the opening when the conduit 50 is disposed in a first position relative to the opening, but to prevent the first and second protrusions from passing through the opening when the conduit 50 is not disposed in the first position relative to the opening.

The resilient seal member 82 is shaped to be received within the opening through the wall 46 and be disposed in sealing association between the first end 61 of the conduit 50 and the wall 46 when the conduit 50 is not disposed in the first position relative to the opening. The resilient seal member 82 is provided with first and second extensions, 91 and 92, which are intended to be generally aligned with the first and second protrusions, 71 and 72, respectively for insertion into the opening. The relationship between the first and second protrusions, the first and second extensions, and the opening in the wall 46 will be described in greater detail below.

With continued reference to FIG. 2, it can be seen that the first end 61 of the conduit 50 is shaped to be received in a female connector such as that which is shown in FIG. 3. FIG. 3 is a section view of a connector that is available in commercial quantities from "legris" which is a division a Groupe Legris Industries. These connectors are well known to those skilled in the art and will not be described in detail herein. However, it should be understood that the first end 61 of the conduit 50 is shaped to be received in sealing and locking relationship within the internal cavity of the connector 96 shown in FIG. 3. The ridge 95 shown in FIG. 2 is received in locking relationship within the internal cavity of the female connector 96 and is releasable through a movement of a movable portion 97. For purposes of convenience, the first end 61 of the present invention has been formed to be received in this manner by this known type of female connector 96.

Figure 4:
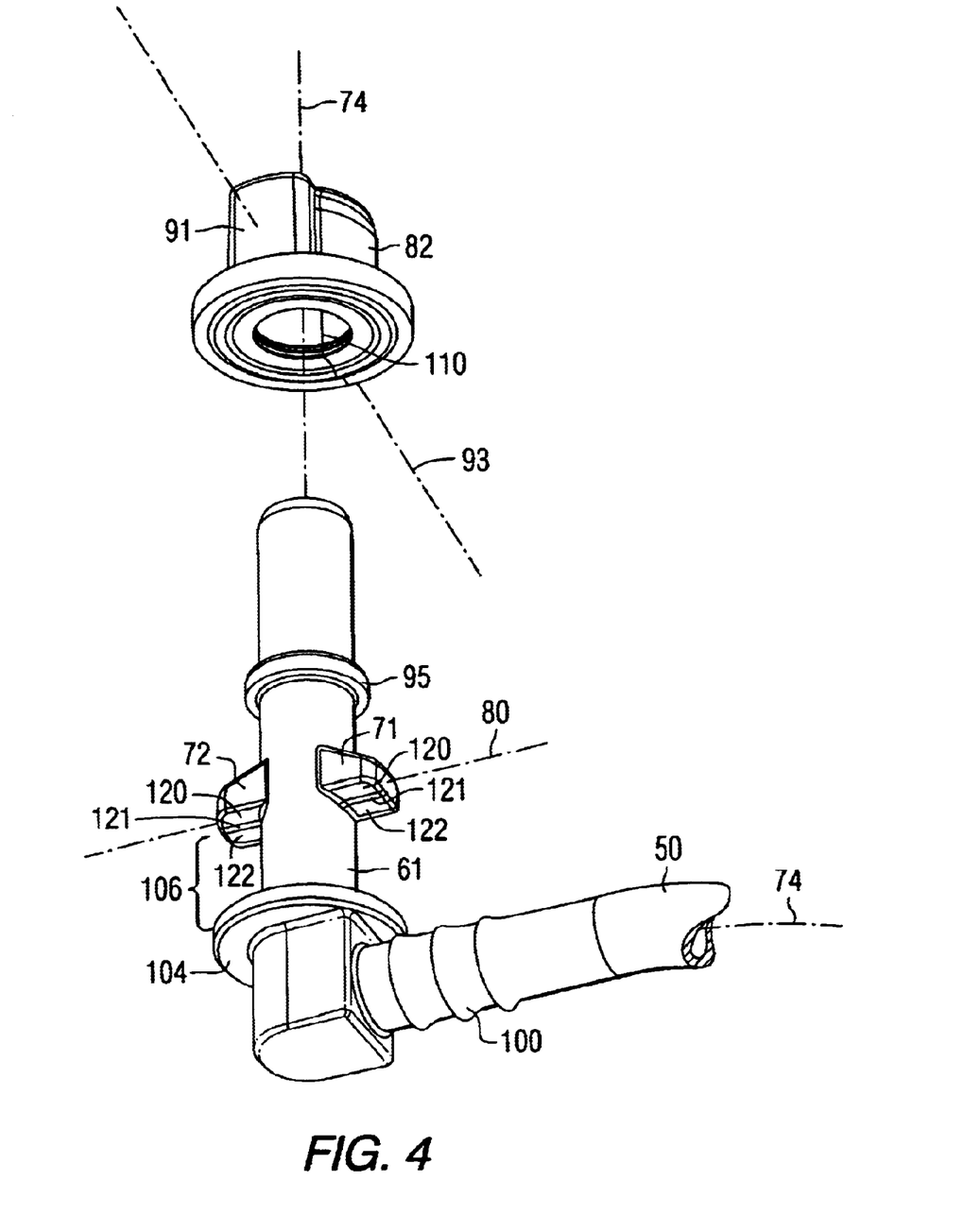
FIG. 4 is an isometric exploded view of the conduit, first end, and resilient seal member of the present invention.

FIG. 4 is an exploded isometric view of the first end 61 of the present invention. As can be seen, a barbed end 100 is provided to facilitate connection to a flexible conduit 50 in order to allow the component shown in FIG. 4 to become a first end 61 of the conduit 50. The first and second protrusions, 71 and 72, are illustrated extending radially outward from the central axis 74 and along axis 80. In a preferred embodiment of the present invention, the first and second protrusions, 71 and 72, are formed as an integral portion of the first end 61. A collar 104 also extends from the first end 61 of the conduit 50. The collar 104 is spaced axially from the first and second protrusions, 71 and 72, to provide a space 106 between the opposing surfaces of the protrusions and the collar 104. This space 106 is shaped to receive the resilient seal member 82 within it.

In FIG. 4, the resilient seal member 82 is shown with its extensions, as represented by extension 91, positioned with their axis 93 not aligned with axis 80. After assembly of the resilient seal member 82 into the position within space 106, the extensions, 91 and 92, are intended to be aligned with the protrusions, 71 and 72, for purposes that will be described in greater detail below. A split line 110 is provided in the resilient seal member 82 to facilitate the assembly of the resilient seal member 82 around the portion of the first end 61 in the space 106.

With continued reference to FIG. 4, it can be seen that the surfaces of the first and second protrusions, 71 and 72, that face the collar 104 comprise a taper that results in two surfaces, 120 and 122, which are intended to facilitate the installation of the first end 61 into an opening formed through the wall 46, described above in conjunction with FIG. 1. These two surfaces, 120 and 122, that are formed on each of the two protrusions, 71 and 72, and have a generally flat surface 121 between them, assist the operator when the conduit 50 is moved away from a first position to another position. The surfaces, 120 and 122, act as beveled surfaces to facilitate the rotation of the first end away from the first position. The surface 121 is located between them in certain embodiments of the present invention.

Figure 5:
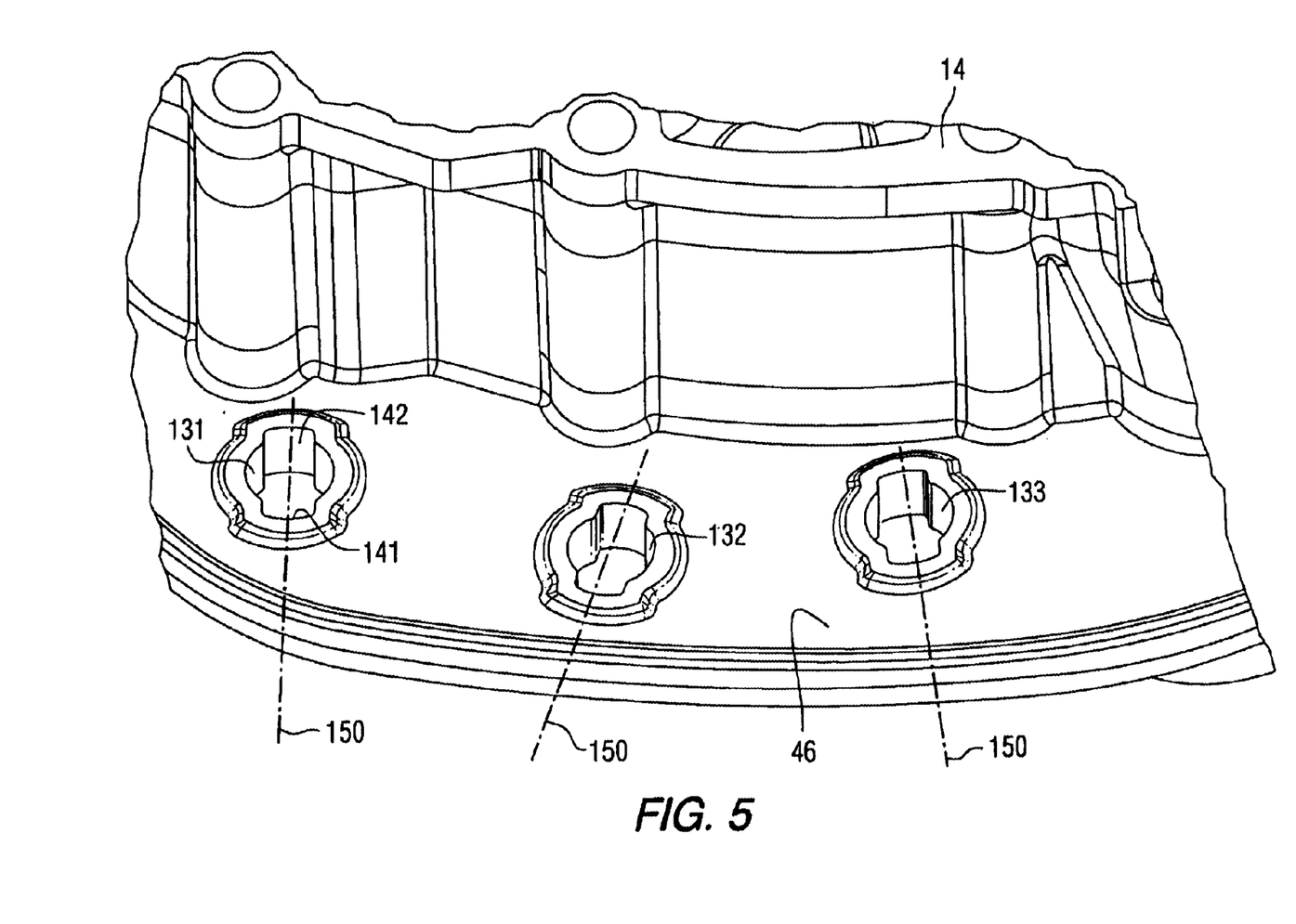
FIG. 5 shows a wall of an adaptor plate with three openings formed therethrough.

FIG. 5 is a section of the adaptor plate 50 which comprises the wall 46 described above in conjunction with FIG. 1. Three openings, 131–133, are shown formed through the wall 46. Each of the openings, 131–133, is provided with a first slot 141 and a second slot 142. With reference to opening 131, the first and second slots are shaped to receive the first and second protrusions, 71 and 72, therein in order to allow the first and second protrusions to pass through the first and second slots when the conduit 50 is disposed in a first position relative to the opening 131. As can be seen in FIG. 5, the first and second slots, 141 and 142, are aligned along an axis 150 and are diametrically opposed to each other. For purposes of the description of the preferred embodiment of the present invention, the first position relative to the opening 131, as described above, refers to the position of the conduit 50 that results in the first and second protrusions, 71 and 72, being aligned with the first and second slots, 141 and 142, respectively. This first position is the only position that will allow the first end 61 of the conduit 50 to be moved upwardly through an associated one of the openings, 131–133. Each of the openings, 131–133, shown in FIG. 5 are similarly shaped and configured although their respective axis 150 are not necessarily aligned or parallel with each other.

Figure 6:
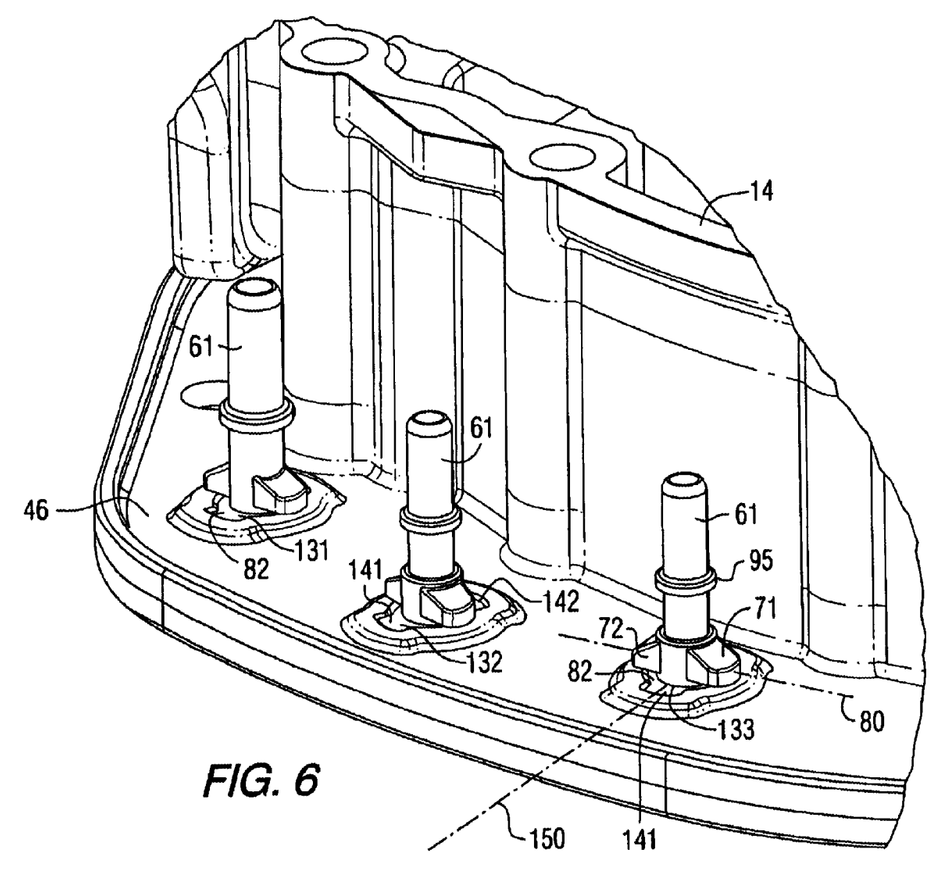
FIG. 6 illustrates the openings of FIG. 5 with first ends of conduits attached thereto according to the principles of the present invention.

FIG. 6 shows three first ends 61 extended upward through openings, 131–133, formed through the wall 46 of the adaptor plate 14. With particular reference to the first end 61 that is extended upwardly through opening 133, it can be seen that the first and second protrusions, 71 and 72, are not aligned with the first and second openings. Axis 80, which is aligned with the first and second protrusions, 71 and 72, is not aligned with axis 150 which is aligned with the first and second slots of opening 133. Therefore, in the example represented in FIG. 6, the first and second protrusions, 71 and 72, are prevented from passing through the opening 133 because the conduit 50 is not disposed in the first position relative to the opening 133. In other words, axis 80 is not aligned with axis 150. The positions shown in FIG. 6 represent locked positions that rigidly hold the conduit in place and compresses the resilient members 82 within the openings. It should be noted that rotation of the first ends 61 relative to their associated openings does not cause the resilient seal member 82 to rotate. Once the resilient seal member 82 is inserted into its associated opening, the extensions, 91 and 92, remain in place within their associated slots, 141 and 142. It should also be noted that rotation of the first ends 61 relative to their associated one of the plurality of openings, 131–133, also causes the first and second protrusions, 71 and 72, to move axially upward in FIG. 6 as a result of the tapered configuration formed by surfaces 120 and 122 as described above in FIG. 4. This exerts a compressive force against the resilient seal member 82 as a result of the collar 104 moving slightly upward to the wall 46. The raised ring 213 on the bottom surface improves the sealing function of the seal member 82 and also allows the raised ring 213 to compress to ease the compression operation. If the raised ring 213 was not provided, a significantly higher compressive force would be required by the collar 104 because it would have to compress the entire lower flange 191. Therefore, moving the conduit 50 out of its first position relative to the opening performs two valuable functions. First, it locks the first end 61 into position relative to the wall 46 to prevent it from moving axially out of its associated opening and it also compresses the resilient seal member 82 within the internal cavity of the opening to enhance its sealing function which prevents liquid from passing through the opening and through the region between the inner surface of the opening and the outer surface of the first end 61 of the conduit 50. As a result, the present invention provides a leak tight fit between the conduit 50 and the wall 46, but allows fluid to pass through the internal cavities of the conduits 50 to allow fuel and water to flow through the wall 46 and to allow pressure to be sent between one side of the wall 46 and the other.

Figure 7:
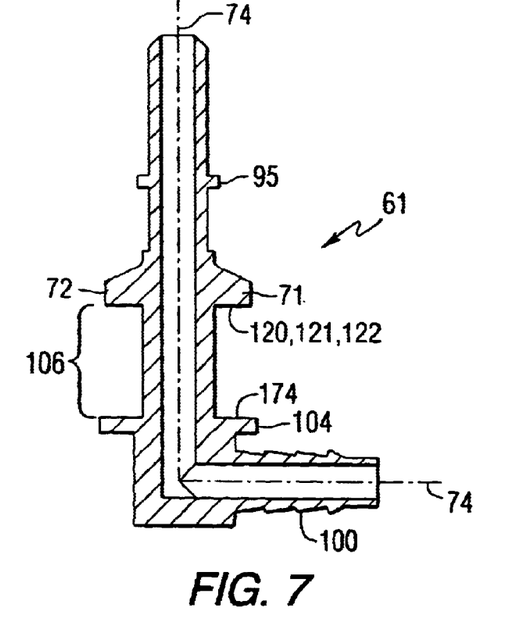
FIG. 7 is a section view of the first end of the conduit made in accordance with the present invention.
Figure 8:
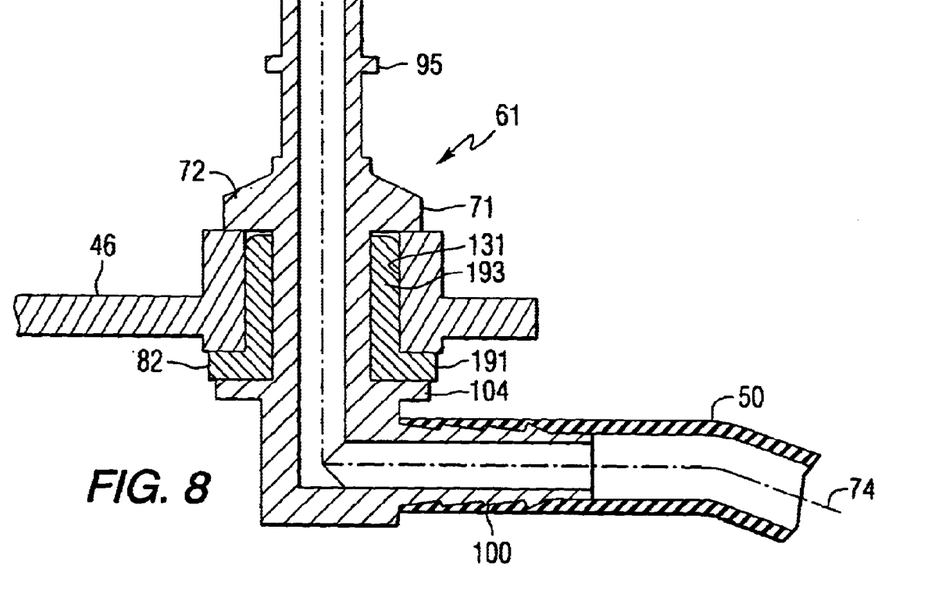
FIG. 8 is a section view of the conduit first end assembled to a wall with a resilient seal member disposed within an opening through the wall.

FIG. 7 is a section view of the first end 61 of the conduit in a preferred embodiment of the present invention. FIG. 8 is a section view showing the first end 61 attached in sealing relation with an opening 131 formed through the wall 46.

With reference to FIGS. 7 and 8, it can be seen that the space 106 between the upper surface 174 of the collar 104 and the lower surfaces, 120, 121 and 122, of the first and second protrusions, 71 and 72, is shaped to receive the resilient seal member 82 therein. When the first and second protrusions, 71 and 72, are aligned with the first and second extensions, 91 and 92, of the resilient seal member 82 the first end 61 can be passed through the associated opening, as represented by opening 131 in FIG. 8. This can be done when the conduit 50 is in the first position relative to the opening 131 and relative to the wall.46. After inserting the first end 61 into the opening 131, the conduit assembly is rotated about the centerline of the opening 131 to move the first and second protrusions, 71 and 72, away from the first position. This rotation performs two important functions. First, when the first and second protrusions, 71 and 72, are not aligned with the first and second slots, 141 and 142, the first end 61 is locked into position and can not physically be removed from the opening 131. Additionally, rotation of the first end 61 in this manner causes the upper surface 174 of the collar 104 to move upwardly toward the wall 46. The reason for this upward movement is that the two ramped surfaces, 120 and 122, of the first and second protrusions, 71 and 72, raise the first end 61 as the first and second protrusions are rotated from their aligned relationship with the first and second slots, 141 and 142, to a non aligned relationship with them. The two slanted surfaces, 120 and 122, serve as beveled edges that also facilitate the beginning of the movement of the first end 61 away from the first position relative to the associated opening 131. After the beveled surfaces, 120 or 122, assist in this rotation of the first end, the continuing force is against the central surface 121. The upward movement of the collar 104 compresses the lower flange 191 of the resilient seal member 82 between the collar 104 and the lower surface of the wall 46. This enhances the sealing effect of the present invention. In addition, the slight taper of the barrel portion 193 of the resilient seal member 82 is also forced upwardly within the opening 131 to also enhance the sealing effect of the present invention.

Figure 9:
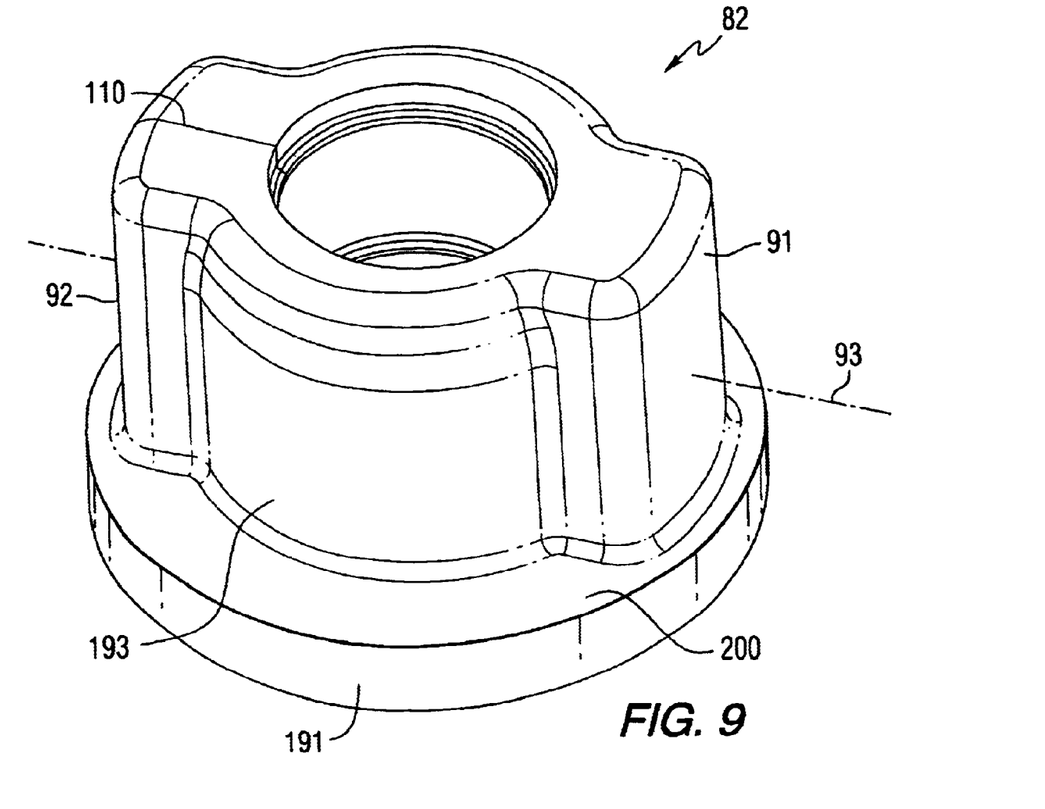
FIG. 9 is an isometric view of the resilient seal member of the present invention.

FIG. 9 is an isometric view of the resilient seal member 82, showing the flange 191 and the barrel portion 192 of the device. The split line 110 allows the resilient seal member 82 to be opened slightly to facilitate its installation around the region of the first end 61 in the space identified by reference numeral 106 above. Axis 93 illustrates the alignment between the first and second extensions, 91 and 92, which are intended to be aligned with the first and second protrusions, 71 and 72, described above in conjunction with FIGS. 7 and 8. The upper surface 200 of the flange 191 serves as a sealing surface when it is forced upwardly against the wall 46 by the upward movement of the collar 104, as described above.

Figure 10:
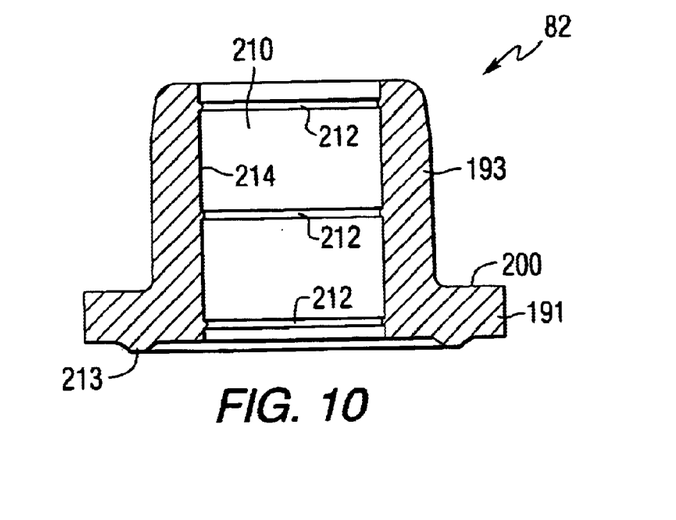
FIG. 10 is a section view of the resilient seal member of the present invention.

FIG. 10 is a section view of the resilient seal member 82. The internal opening 210 of the resilient seal member 82 is provided with a plurality of ridges 212 which are circumferential protrusions extending around the inner periphery of the resilient seal member 82. These ridges 212 serve to enhance the sealing effect by providing a compressive force against the outer surface of the first end 61 of the conduit 50 within the space 106. Also, the two different effective inner diameters provided by the ridges 212 and the other portion 214 of the cavity 210 provide space into which the elastomeric material of the resilient seal member 82 can move when it is compressed by the upward movement of the collar 104 as described above.

With reference to FIGS. 1–10, the present invention provides a device for providing a seal around the conduit 50 extending through a wall 46. In a preferred embodiment, openings, 131–133, are formed through the wall 46. A conduit 50 has a first end 61, a second end 62, and a central axis 74 extending within a cavity of the conduit 50 and along its length. The first end 61 is shaped to pass through the opening, such as openings 131–133, when the conduit 50 is disposed in a first position relative to the opening. The first end 61 is shaped to prevent the first end 61 from passing through the opening when the conduit 50 is not disposed in the first position relative to the opening. As described above, the first position of the conduit relative to the opening is the position where axis 80 is generally aligned in parallel association with axis 150. A resilient seal member 82 is attached to the first end 61 of the conduit 50. The resilient seal member is shaped to be received within the opening and be disposed in sealing association between the conduit 50 and the wall 46 when the conduit 50 is not disposed in the first position relative to the opening. In other words, when axis 80 is not aligned with axis 150 in parallel association, the conduit 50 is not in the first position. This condition is illustrated in FIG. 6.

First and second protrusions, 71 and 72, extend from the first end 61 in directions generally radially outward from the central axis 74. The locations of the first and second protrusions, 71 and 72, are generally diametrically opposed from each other. The first and second protrusions are shaped to allow the first end 61 to pass through the opening when the conduit 50 is disposed in the first position relative to the opening and the first and second protrusions are shaped to prevent the first end 61 from passing through the opening when the conduit 50 is not disposed in the first position relative to the opening. A collar 104 extends from the first end 61 of the conduit 50 and the resilient seal member 82 is disposed between the collar 104 and the first and second protrusions, 71 and 72. The resilient seal member is shaped to be compressed between the collar 104 and the first and second protrusions when the conduit 50 is not disposed in the first position relative to the opening. First and second extensions, 91 and 92, of the resilient seal member can be aligned with the first and second protrusions, 71 and 72, of the first end 61. In this condition, the first and second protrusions and first and second extensions can pass through and into the first and second slots, 141 and 142, when the conduit 50 is disposed in the first position relative to the opening. The resilient seal member 82 comprises a split line 110 which allows the first end 61 of the conduit 50 to be inserted into the central cavity of the resilient seal member. The second end 62 of the conduit 50 is attached in fluid communication with a fuel reservoir, such as the fuel system module 40, of an outboard motor. The first end 61 of the conduit 50 is connectable in fluid communication with a fuel system of the outboard motor. The wall 46 is part of an adaptor plate 14 of an outboard motor in a preferred embodiment of the present invention.

Although the present invention has been described with particular detail and illustrated with specificity to show a particularly preferred embodiment, it should be understood that alternative embodiments are also within its scope.

We claim:

1. A device for providing a seal around a conduit extending through a wall, comprising:

an opening formed through said wall;

a conduit having a first end, a second end, and a central axis extending within a cavity of said conduit and along its length, said first end being shaped to pass through said opening when said conduit is disposed in a first position relative to said opening, said first end being shaped to prevent said first end from passing through said opening when said conduit is not disposed in said first position relative to said opening;

a resilient seal member attached to said first end of said conduit, said resilient seal member being shaped to be received within said opening and be disposed in sealing association between said conduit and said wall when said conduit is not disposed in said first position relative to said opening, said resilient sealing member being compressed between said first end and said wall when said conduit is not disposed in said first position relative to said opening;

first and second protrusions extending in directions generally radially outward from said central axis, said first and second protrusions being shaped to allow said first end to pass through said opening when said conduit is disposed in said first position relative to said opening, said first and second protrusions being shaped to prevent said first end from passing through said opening when said conduit is not disposed in said first position relative to said opening:

a collar extending from said first end of said conduit, said resilient seal member being disposed between said collar and said first and second protrusions, said resilient seal member being shaped to be compressed between said collar and said first and second protrusions when said conduit is not disposed in said first position relative to said opening; and first and second extensions attached to said resilient seal member and aligned with said first and second protrusions, respectively, said opening having first and second slots shaped to receive said first and second protrusions, respectively, therein to allow said first and second protrusions to pass through said first and second slots, respectively, when said conduit is disposed in said first position relative to said opening.

2. A device for providing a seal around a conduit extending through a wall, comprising:

an opening formed through said wall;

a conduit having a first end, a second end, and a central axis extending within a cavity of said conduit and along its length;

a first protrusion attached to said conduit proximate said first end and extending in a direction generally radially outward from said central axis, said first protrusion being shaped to pass through said opening when said conduit is disposed in a first position relative to said opening, said first protrusion being shaped to prevent said first protrusion from passing through said opening when said conduit is not disposed in said first position relative to said opening; and a resilient seal member attached to said first end of said conduit, said resilient seal member being shaped to be received within said opening and be disposed in sealing association between said conduit and said wall when said conduit is not disposed in said first position relative to said opening; and a first extension attached to said resilient seal member and aligned with said first protrusion.

3. The device of claims 2, wherein:

said wall is an adapter plate of an outboard motor.

4. The device of claim 2, further comprising:

a second protrusion attached to said conduit proximate said first end and extending in a direction generally radially outward from said central axis, said second protrusion being shaped to pass through said opening when said conduit is disposed in said first position relative to said opening, said second protrusion being shaped to prevent said second protrusion from passing through said opening when said conduit is not disposed in said first position relative to said opening.

5. The device of claim 4, wherein:

said first and second protrusions are diametrically opposed to each other.

6. The device of claim 2, further comprising:

a collar extending from said first end of said conduit, said resilient seal member being disposed between said first protrusion and said collar.

7. The device of claim 6, wherein:

said resilient seal member is shaped to be compressed between said collar and said first protrusion when said conduit is not disposed in said first position relative to said opening.

8. The device of claim 2, wherein:

said opening has a first slot shaped to receive said first protrusion therein to allow said first protrusion to pass through said first slot when said conduit is disposed in said first position relative to said opening.

9. The device of claim 2, wherein:

said resilient seal member comprises a split line to allow insertion of said first end into a central cavity of said resilient seal member.

10. The device of claim 2, wherein:

said second end of said conduit is attached in fluid communication with a fuel reservoir of an outboard motor.

11. The device of claim 2, wherein:

said first end of said conduit is connectable in fluid communication with a fuel system of an outboard motor.

12. A device for providing a seal around a conduit extending through a wall, comprising:

an opening formed through said wall;

a conduit having a first end, a second end, and a central axis extending within a cavity of said conduit and along its length, said first end being shaped to pass through said opening when said conduit is disposed in a first position relative to said opening, said first end being shaped to prevent said first end from passing through said opening when said conduit is not disposed in said first position relative to said opening;

a resilient seal member attached to said first end of said conduit, said resilient seal member being shaped to be received within said opening and be disposed in sealing association between said conduit and said wall when said conduit is not disposed in said first position relative to said opening;

said first end comprises a first protrusion and a second protrusion, said a first and second protrusions extending in directions generally radially outward from said central axis, said first and second protrusions being shaped to allow said first end to pass through said opening when said conduit is disposed in said first position relative to said opening, said first and second protrusions being shaped to prevent said first end from passing through said opening when said conduit is not disposed in said first position relative to said opening; and first and second extensions attached to said resilient seal member and aligned with said first and second protrusions, respectively.

13. The device of claim 12, further comprising:

a collar extending from said first end of said conduit, said resilient seal member being disposed between said collar and said first and second protrusions.

14. The device of claim 10, wherein:

said resilient seal member is shaped to be compressed between said collar and said first and second protrusions when said conduit is not disposed in said first position relative to said opening.

15. The device of claim 12, wherein:

said opening has first and second slots shaped to receive said first and second protrusions, respectively, therein to allow said first and second protrusions to pass through said first and second slots, respectively, when said conduit is disposed in said first position relative to said opening.

16. The device of claim 15, wherein:

said resilient seal member comprises a split line to allow insertion of said first end into a central cavity of said resilient seal member.

17. The device of claim 16, wherein:

said second end of said conduit is attached in fluid communication with a fuel reservoir of an outboard motor.

18. The device of claim 17, wherein:

said first end of said conduit is connectable in fluid communication with a fuel system of an outboard motor.

19. The device of claim 12, wherein: said wall is an adapter plate of an outboard motor.

20. A device for providing a seal around a conduit extending through a wall, comprising:

an opening formed through said wall;

a conduit having a first end, a second end, and a central axis extending within a cavity of said conduit and along its length, said first end being shaped to pass through said opening when said conduit is disposed in a first position relative to said opening, said first end being shaped to prevent said first end from passing through said opening when said conduit is not disposed in said first position relative to said opening;

a resilient seal member attached to said first end of said conduit, said resilient seal member being shaped to be received within said opening and be disposed in sealing association between said conduit and said wall when said conduit is not disposed in said first position relative to said opening;

first and second protrusions extending in directions generally radially outward from said central axis, said first and second protrusions being shaped to allow said first end to pass through said opening when said conduit is disposed in said first position relative to said opening, said first and second protrusions being shaped to prevent said first end from passing through said opening when said conduit is not disposed in said first position relative to said opening;

a collar extending from said first end of said conduit, said resilient seal member being disposed between said collar and said first and second protrusions, said resilient seal member being shaped to be compressed between said collar and said first and second protrusions when said conduit is not disposed in said first position relative to said opening; and first and second extensions attached to said resilient seal member and aligned with said first and second protrusions, respectively, said opening having first and second slots shaped to receive said first and second protrusions, respectively, therein to allow said first and second protrusions to pass through said first and second slots, respectively, when said conduit is disposed in said first position relative to said opening.

21. The device of claim 20, wherein:

said resilient seal member comprises a split line to allow insertion of said first end into a central cavity of said resilient seal member.

22. The device of claim 20, wherein:

said second end of said conduit is attached in fluid communication with a fuel reservoir of an outboard motor.

23. The device of claim 20, wherein:

said first end of said conduit is connectable in fluid communication with a fuel system of an outboard motor.

24. The device of claim 20, wherein:

said wall is an adapter plate of an outboard motor.

\* \* \* \* \*